(12) United States Patent
Kiyashchenko et al.

(10) Patent No.: US 7,791,981 B2
(45) Date of Patent: Sep. 7, 2010

(54) VELOCITY ANALYSIS FOR VSP DATA

(75) Inventors: Denis Kiyashchenko, Rijkwijk (NL); William Alexander Mulder, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/121,470

(22) Filed: May 15, 2008

(65) Prior Publication Data

US 2009/0285053 A1    Nov. 19, 2009

(51) Int. Cl.
*G01V 1/00* (2006.01)
(52) U.S. Cl. ........................................ 367/73
(58) Field of Classification Search .............. 367/38, 367/56, 57, 73, 52; 702/14, 16
See application file for complete search history.

(56) References Cited

U.S. PATENT DOCUMENTS

| | | | | |
|---|---|---|---|---|
| 4,817,014 A * | 3/1989 | Schneider et al. | ........... | 708/422 |
| 5,089,994 A * | 2/1992 | Harlan et al. | ................. | 367/73 |
| 5,373,443 A * | 12/1994 | Lee et al. | ....................... | 702/7 |
| 6,253,157 B1 * | 6/2001 | Krebs | .......................... | 702/18 |
| 6,510,105 B1 | 1/2003 | Kroode et al. | ................. | 367/68 |
| 7,065,004 B2 * | 6/2006 | Jiao et al. | ..................... | 367/51 |
| 7,110,323 B2 * | 9/2006 | Marmalyevskyy et al. | ..... | 367/37 |
| 2004/0041815 A1 | 3/2004 | Meek et al. | ................. | 345/582 |
| 2006/0058592 A1 * | 3/2006 | Bouma et al. | ................ | 600/301 |
| 2006/0155477 A1 | 7/2006 | Matson et al. | ................ | 702/14 |
| 2007/0021951 A1 | 1/2007 | Seislink | ........................ | 703/10 |
| 2007/0214663 A1 | 9/2007 | Pica | ........................... | 33/1 HH |
| 2008/0059075 A1 * | 3/2008 | Colombo et al. | .............. | 702/18 |
| 2008/0221796 A1 * | 9/2008 | Lou et al. | ....................... | 702/6 |

FOREIGN PATENT DOCUMENTS

WO    WO2009077440 A2    6/2009

OTHER PUBLICATIONS

Yu et al, Joint migration of primary and multiple reflections in RVSP data, SEG Int'l Exposition and 72 Annual Meeting, Oct. 6-11, 2002.*
Yu et al., "Joint migration of primary and multiple reflections in RVSP data", SEG Int'l Exposition and 72nd Annual Meeting, Oct. 6-11, 2002.*

* cited by examiner

*Primary Examiner*—Jack Keith
*Assistant Examiner*—Krystine Breier

(57) ABSTRACT

A method for providing a velocity profile for a subsurface region that includes the reflective interfaces, the method comprising the steps of: providing a set of data comprising signals transmitted by a transmitter and collected at a receiver, wherein the data include a primary signal that has been reflected off of one of the reflective interfaces and a multiply-reflected signal that has been reflected off of at least two of the reflective interfaces, providing a velocity model for the subsurface region, using the velocity model and the primary signal to construct a first image of the subsurface region, using the velocity model and the multiply-reflected signal to construct a second image of the subsurface region, determining a measure of match between the first and second images, adjusting the velocity model based on this measure, and repeating the steps until the measure of match attains a desired level.

15 Claims, 1 Drawing Sheet

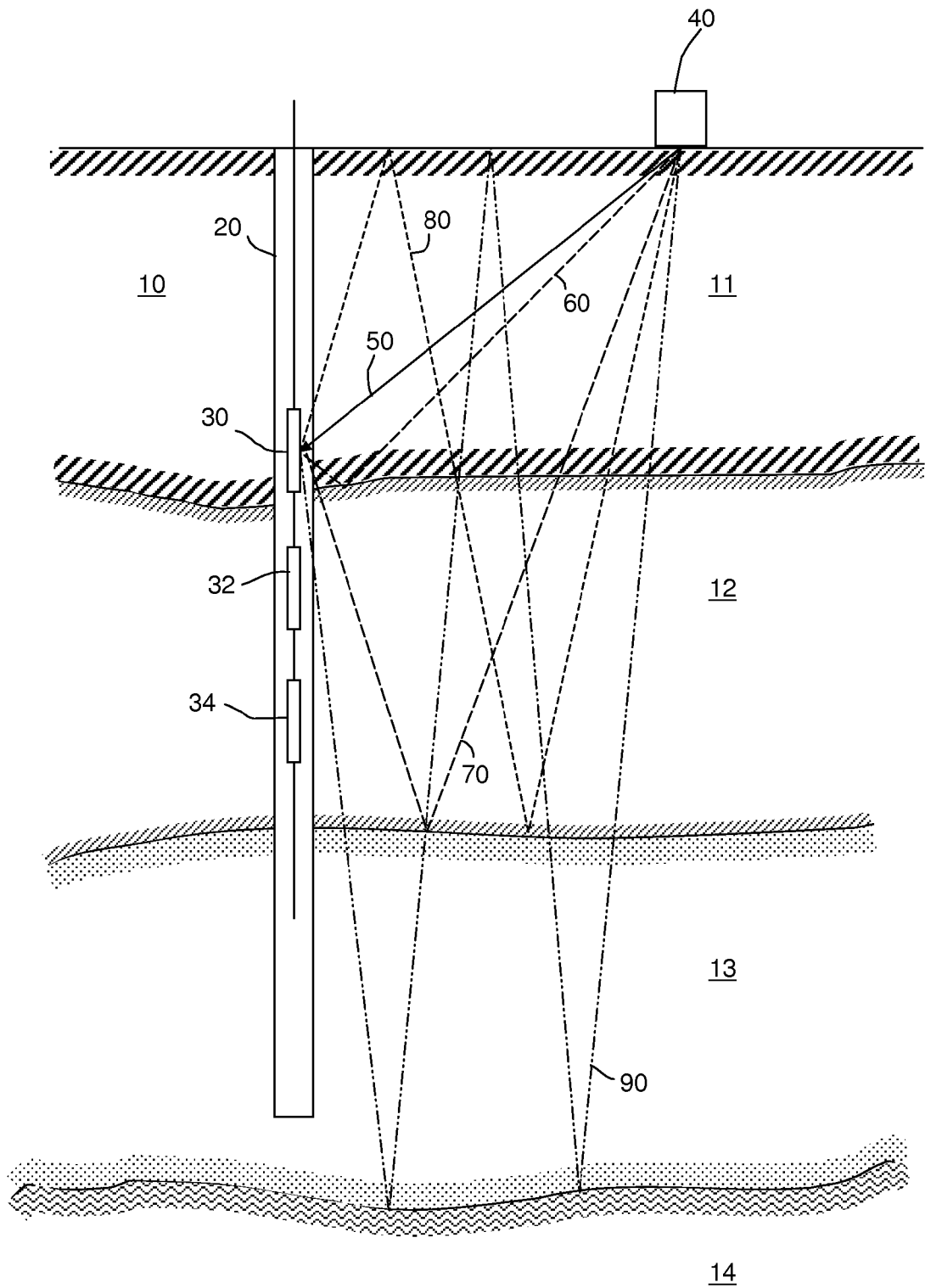

VELOCITY ANALYSIS FOR VSP DATA

RELATED CASES

Not applicable.

FIELD OF THE INVENTION

The invention relates to methods for obtaining information about subsurface formations using signals reflected from two or more interfaces.

BACKGROUND OF THE INVENTION

A vertical seismic profile (VSP) is a technique of seismic measurements with down-hole receivers. VSP data usually are obtained by generating one or more shots from a seismic source located in one or more selected positions on the surface. The signal produced by each shot is detected at locations along a borehole extending into the formation by multiple receivers, or by a group of receivers that is moved along the borehole. The primary goal of a VSP is obtaining the subsurface reflectivity (which gives information about geological formations) with high vertical resolution, which may be achieved because the frequency content of VSP data is usually higher than that of surface seismic. Other applications include generating an image of the subsurface area that is poorly illuminated with surface seismic, recovery of attenuation, and reservoir characterization.

The method called reflection imaging allows one to get the reflectivity distribution in the subsurface. The success of reflection imaging strongly depends on the velocity model assumed during migration of seismic data (the process by which the seismograms in the time domain are mapped into subsurface images in the depth domain). For VSP imaging, a velocity model retrieved from surface seismic is typically used. But due to lower resolution and overburden complexities, this model may be inaccurate. Inaccurate velocity models smear reflection events in VSP images and result in mismatches between VSP and surface seismic images. The velocity model above the borehole receivers may be improved by first break travel time tomography of the VSP data itself. It is difficult to improve the velocity model below the borehole receivers by conventional velocity analysis or reflection tomography, however, because of the very limited range of incident wave angles in the VSP data. Thus, it is desirable to provide a method that can be used to recover accurately the velocity model for portions of the formation below the downhole receiver(s).

SUMMARY OF THE INVENTION

In accordance with preferred embodiments of the invention, there is provided a method that can be used to retrieve the seismic wave velocity from VSP data for portions of the formation above and below the down-hole receiver(s). According to one preferred embodiment, the invention provides a method of determining a seismic velocity model for a subsurface region including at least two reflective interfaces, comprising the steps of:

a) providing a set of data comprising signals produced by at least one source and collected by at least one receiver in the borehole, wherein the data include at least one primary signal that has been reflected off of one of the reflective interfaces and at least one multiply-reflected signal that has been reflected off of at least two reflective interfaces, b) providing a velocity model for the subsurface region, c) using the velocity model and the primary signal to construct a first image of the subsurface region, d) using the velocity model and the multiply-reflected signal to construct a second image of the subsurface region, e) determining a measure of match between the first and second images f) adjusting the velocity model based on the measure determined in step e), and g) repeating steps c) through e) until the measure of match attains a desired level.

Referring briefly to the FIGURE, a formation 10 is shown, which includes first, second, third and fourth layers 11, 12, 13, and 14, respectively. A borehole 20 extends into formation 10, through layers 11 and 12 and terminates in layer 13. As is known in the art, a plurality of receivers 30, 32, 34 are lowered to a desired depth in the hole. If directional data is desired, receivers 30, 32, 34 may be fixed within borehole 20 so that their orientation as well as their depth is known. Also as is known in the art, a seismic source 40 is provided at the surface. Seismic source 40 is typically mobile, so that seismic signals from several locations can be sent and detected by the receivers.

The imaging steps allow comparison of the data generated using once-reflected waves, hereinafter referred to as "primary reflections" (see FIG. 60, 70), and data generated using surface-related multiply-reflected waves, hereinafter referred to as "multiples" (see FIG. 80). In the time domain, these are separated. In the depth image domain, however, the images should be the same if the correct velocity model is used to map between time and depth. Conversely, if the images are not the same, the velocity model can be updated until the images converge. The resulting velocity model will be more accurate and thus more useful than velocity models generated by other methods.

When the velocity model is erroneous, the images obtained by primary reflections and by multiples will not coincide with each other. According to preferred embodiments of the invention, a functional that is based on a cross-correlation of the images is defined. This functional has a maximum when the velocity model is correct and it can therefore be used in an optimization procedure to update the velocity model. The gradient of the cross-correlation functional with respect to the model parameters will give the direction of the needed velocity model update. In preferred embodiments, the adjoint-state method for gradient computation is used. In order to find the maximum of the cross-correlation functional, the conjugate-gradient method is applied.

Apart from this formal approach, other methods of measure of match and velocity updates are possible, including inspection of the match between primary reflection and multiple images followed by other adjustments of the velocity model.

It will be understood that the terms "interfaces" and "reflective interfaces" as used herein relate to all reflectors of signals travelling through the earth or sea, including the surface of the earth or the surface of the sea.

BRIEF DESCRIPTION OF THE DRAWINGS

For a more detailed understanding of the invention, reference is made to the accompanying FIGURE, which is a schematic illustration of some concepts underlying the present invention.

DETAILED DESCRIPTION OF A PREFERRED EMBODIMENT

Referring again to the FIGURE, regardless of the position of seismic source 40, a seismic signal from source 40 will take several paths before arriving at a given receiver. For simplicity, the following discussion relates to receiver 30, however it will be understood that the concepts disclosed herein relate to each receiver in a similar fashion. A direct arrival signal 50 will travel directly from source 40 to receiver 30. Primary reflection signals 60, 70 will arrive at receiver 30 after being reflected from one interface. Thus, primary signal 60 is reflected off of the top of layer 12 and primary signal 70 is reflected off of the top of layer 13. In addition, several multiply-reflected signals, multiples 80, 90, will arrive at receiver 30 after being reflected from two or more interfaces. Unlike the direct signal 50, both primary signals 60, 70 and multiple signals 80, 90 can contain information relating to the layers 12, 13 whose boundaries are below receiver 30.

The proposed method preferably employs surface-related multiples. As used herein, the term "surface-related multiples" refers to multiples that include at least one reflection off of the interface where the sources are placed. In cases where the seismic source is located on the earth's surface, surface-related multiples are multiples that include at least one reflection off of the earth's surface.

In marine VSP however, the seismic source may not be located on the earth's surface, and instead may be on the surface of the sea or at some depth beneath it. In these cases, the signals may be redatumed to create an artificial source that is either on the seafloor or on the surface of the water. Redatuming is a method of generation of data for artificial sources and/or receivers based on data for given set of real sources and receivers, using a known velocity model of the depth interval between the real and desired artificial sources (or receivers). When redatumed signals are used to simulate the generation of seismic signals at a surface (such as the seafloor), the term "surface-related signals" refers to signals that, after redatuming, appear to have been reflected by that same surface.

Method

In order to simplify the calculations, for conventional VSP, it is preferred to group data according to the receiver at which it is received, rather than according to the transmitter from which it originated. Thus, data that is originally collected according to transmitter may be reorganized prior to processing. Then, during calculations, the sources on the earth surface are assigned to be receivers and the receivers in the borehole are treated as sources.

The wave-equation pre-stack depth migration of common-shot data consists of solving the direct problem and back-propagation of the receiver data into formation with a known velocity model and then using the imaging principle. The incident pressure field $u_s(\vec{x}, \omega)$ due to the source term $f_s(\vec{x}, \omega)$ in the frequency domain satisfies:

$$Lu_s = f_s,$$

where $L = -\omega^2 \sigma^2(\vec{x}) - \Delta$ is the wave equation operator in the frequency domain, and $\sigma(\vec{x})$ is slowness. The source of this direct wave field is located at the borehole receiver position. The wave field should satisfy the radiation conditions at the boundaries of the volume being considered.

To compute the image using the primary signal, we introduce the back propagated field $u_{ip}(\vec{x}, \omega)$, defined by:

$$Lu_{ip} = 0,$$

$$u_{ip}|_{z=0} = d_p^*,$$

where $d_p$ is the primary reflection data (* denotes the adjoint).

To obtain the image using multiples, we compute the "reflection" of the source field $u_d(\vec{x}, \omega)$ from free-surface, and the back propagated field of the surface-related multiples $u_{im}(\vec{x}, \omega)$, which satisfy:

$$Lu_d = 0,$$

$$u_d|_{z=0} = d_{dir},$$

$$Lu_{im} = 0,$$

$$u_{im}|_{z=0} = d_{m^*},$$

where $d_{dir}$—surface values of primary wave field radiated by source and $d_m$—the surface-related multiple field. The fields $u_d$, $u_{im}$ and $u_{ip}$ should also satisfy the radiation conditions for outgoing waves. It is not easy to split the total wave field into constituents (primary, reflection, multiple), so practically the total measured wave field may go to the right part of the above equations.

The images given by primary reflections, $I_p(\vec{x})$, and by surface-related multiples, $I_m(\vec{x})$ are:

$$I_p(\vec{x}) = \sum_\omega u_s(\vec{x}, \omega) u_{ip}(\vec{x}, \omega),$$

$$I_m(\vec{x}) = \sum_\omega u_d(\vec{x}, \omega) u_{im}(\vec{x}, \omega).$$

If the velocity model used in the migration is correct, the images should coincide with each other. According to the present invention, the degree of coincidence is used as a measure of the match of the velocity model to the actual velocity. To exploit this idea, we define a functional $J(\alpha)$, based on cross-correlation of the images $I_p(\vec{x})$ and $I_m(\vec{x})$ $$J(\alpha) = \int I_p(\vec{x}) I_m(\vec{x}) d\vec{x},$$

where $\alpha(\vec{x}) = \sigma^2(\vec{x})$ is the squared slowness.

This functional will have a maximum when the velocity model is correct. The optimization procedure requires defining the gradient of the functional with respect to the velocity model parameters. One efficient, and therefore preferred, approach to computing the gradient is the adjoint-state method. According to this method, the derivative of the cross-correlation functional with respect to the squared slowness $\alpha$ in the point $\vec{x}$ can be written as:

$$\frac{\partial J}{\partial \alpha}(\vec{x}) = -\sum_\omega \omega^2 \begin{bmatrix} \lambda_s(\vec{x}, \omega) u_s(\vec{x}, \omega) + \lambda_{ip}(\vec{x}, \omega) u_{ip}(\vec{x}, \omega) + \\ \lambda_d(\vec{x}, \omega) u_d(\vec{x}, \omega) u_d + \lambda_{im}(\vec{x}, \omega) u_{im}(\vec{x}, \omega) \end{bmatrix}.$$

Here $\lambda_s(\vec{x}, \omega)$, $\lambda_{ip}(\vec{x}, \omega)$, $\lambda_d(\vec{x}, \omega)$, $\lambda_{im}(\vec{x}, \omega)$ are the Lagrange multipliers, which satisfy partial equations:

$$L\lambda_s = I_m u_{ip}, \quad L\lambda_{ip} = I_m u_s,$$

$$L\lambda_d = I_p u_{im}, \quad L\lambda_{im} = I_p u_d,$$

and the same radiation conditions as wave fields.

This approach can be easily summarized for various parameterizations of the medium. For instance, for the medium consisting of a number of homogenous blocks, the derivative of the cross-correlation functional with respect to the squared slowness in the single block $\alpha_i$ can be written as:

$$\frac{\partial J}{\partial \alpha_i} = \int_{V_i} \frac{\partial J}{\partial \alpha}(\vec{x}) d\vec{x},$$

where $V_i$ is the volume of the block.

In order to find the multipliers, it is preferred to use a one-way approximation of the two-way wave equation solution.

Other techniques for measuring the degree of coincidence (match) of the images include but are not limited to: visual comparison of the images, comparison of interface shapes and depths (between two images), comparison of the images in a limited area, and any other criteria for match between images besides cross-correlation, such as adaptive subtraction of the images.

Once the dependence of the cross-correlation functional on selected model parameters has been determined, the gradient of the cross-correlation functional can be used to adjust the velocity model. In a preferred embodiment, the direction of the gradient is used to determine the direction of the adjustment of the velocity model.

Other techniques for adjusting the velocity model include but are not limited to: trial and error, velocity scans (computing the images for the range of velocities to determine for which velocity the best match is obtained), and velocity analysis by layer stripping (taking the region above the first interface from the top, recovering the velocity there, which gives best match between two images of the first interface; taking the region between the first and second interfaces, recovering the velocity there based on images of second interface; and repeating the steps for each lower area).

The adjusted velocity model is then used in conjunction with the primary and multiple data as described above, to generate two new images. The new images are in turn cross-correlated and a measure of their coincidence is made. If a desired degree of coincidence has not been attained, the gradient is again used to adjust the velocity model. The steps of generating images, comparing them, and adjusting the velocity model are repeated until the measure of match, or degree of coincidence, reaches a desired level.

EXAMPLE 1

As a first synthetic example we consider the simple model with only one horizontal reflector at the depth 1.5 km. Velocity above the reflector is linearly dependent on the depth:

$v(z)=az+b,$ where $a=0.6$ s$^{-1}$ is the gradient, and $b=2$ km/s is the velocity for $z=0$. There are 101 sources on the surface placed in the interval from 0 to 4 km with spacing 0.04 km. The vertical well is in the central part of the model. There is one receiver in the well at the depth 0.5 km. VSP data set is simulated by computing a finite difference solution of 2-D acoustic wave equation. The source function is a Ricker wavelet with central frequency of 25 Hz. To compute the images we used a one-way wave equation migration. When the cross-correlation of the images is plotted with respect to the gradient a and the velocity b, the functional has maximum when the model parameters are approximately equal to their correct values.

To find the maximum of this cross-correlation functional by the proposed algorithm, we start with deliberately inaccurate values $a=0.42$ s$^{-1}$ and $b=1.8$ km/s. When images obtained using primary reflection and surface-related multiples with these initial values of the velocity parameters are plotted, these events are undermigrated, i.e., they do not coincide with each other. This is because the first selected migration velocity model is inaccurate. In this example, the velocity is less than the velocity necessary to migrate the data.

After three iterations of the functional maximization algorithm, we obtained the velocity estimation that is much closer to the correct one ($a=0.63$ s$^{-1}$ and $b=1.99$ km/s). It is notable that, in addition to being sensitive to the mean velocity, the cross-correlation functional is sensitive also to gradient of the layer. Plotting the images made of primary reflections and multiples after maximization of the functional shows that the events are fully migrated and they accurately position the reflector.

EXAMPLE 2

The next example is a piecewise homogenous horizontally layered model with three reflectors. For the computation we model 151 sources at the surface with 40 m spacing over 6 km profile. There is one receiver at the depth 0.75 km in the vertical well in the central part of the model. The source function is a Ricker wavelet with central frequency of 25 Hz.

The velocity at the shallowest layer (0-0.25 km) is assumed to be fixed. Before optimization, we assume that the velocity in the other parts of the model is 10% less than the true velocity. Velocity is then successively estimated in the second (0.25-1.2 km) and the third (1.2-2.3 km) layers. First, we mute the images below the second reflector (to exclude the impact of the reflections from the third interface from the correlation) and find the maximum of the functional with respect to the velocity in the second layer. Then this velocity is kept fixed and optimization is carried out with respect to the velocity in the third layer. It required three iterations to estimate the velocity in each layer. This subsequent velocity estimation from layer to layer is called 'layer stripping'. It can be used in the case of a number of the layers in the model. For practical cases when one has a sequence of strong reflectors with a lot of weak ones between them, there is a possibility to recover velocity in the layers between the strongest reflectors by layer stripping.

The velocity profile obtained as a result of the iteration process shows that the recovered velocities are close to the true ones, with maximal discrepancy in the third layer. The cross-correlation functional is dependent on the velocity in the third layer. The maximum is somewhat shifted, possibly due to finite frequency content of the signal.

When migrated primary and multiple reflections are plotted after maximization of the functional, the reflectors have the correct shape and are positioned at the same depth on both images.

One advantage of the present invention is that comparing of the images made of reflections and multiples allows an estimation of the velocity model in areas below the receiver in the well. This is in contrast to conventional direct-arrival travel time tomography, in which the velocity model is generated using only signals that have passed through the region above the receiver. With the reflection tomography it is difficult to retrieve the information about the media below the receivers because of narrow illumination and uncertainties in the reflector positions.

While the present invention has been disclosed and described in terms of preferred embodiments, it will be understood that various modifications can be made without departing from the scope of the invention, which is defined by the claims. For example, all the concepts described above can be applied with layer stripping, i.e. successively for each layer, or group of layers, preferably from the top to bottom of the model.

What is claimed is:

1. A method for generating a useful velocity model for a subsurface region that includes reflective interfaces, the method comprising the steps of:
   a) providing a set of data comprising signals transmitted by at least one transmitter and collected by at least one receiver in the borehole, wherein the data include at least one primary signal that has been reflected off of one of the reflective interfaces and at least one multiply-reflected signal that has been reflected off at least two reflective interfaces;
   b) providing a velocity model for the subsurface region;
   c) using the velocity model and the primary signal to construct a first image of the subsurface region;
   d) using the velocity model and the multiply-reflected signal to construct a second image of the subsurface region;
   e) determining a measure of match between the first and second images;
   f) adjusting the velocity model based on the measure determined in step e);
   g) repeating steps c) through e) on a processor until the measure of match attains a desired level; and
   h) outputting the adjusted velocity model.

2. The method according to claim 1 wherein the multiply-reflected signal is a surface-related signal.

3. The method according to claim 1, wherein the measure of match is the cross-correlation between the first and second images.

4. The method according to claim 3, further including the step of defining a cross-correlation functional with respect to selected model parameters and optimizing the cross-correlation functional.

5. The method according to claim 4, further including the step of using the gradient of the cross-correlation functional with respect to the model parameters to adjust the velocity model prior to repeating step c).

6. The method according to claim 1 wherein the data include signals reflected by at least one interface below the receiver at which the signals are received.

7. The method according to claim 1 wherein the data include signals reflected by at least one interface above the receiver at which the signals are received and at least one interface below the receiver at which the signals are received.

8. The method according to claim 1 wherein the velocity model includes information about the region below the receiver.

9. The method according to claim 1 where step e) includes visual or analytical inspection.

10. The method according to claim 1 where step e) includes a mathematical operation.

11. The method according to claim 1 where the velocity model is adjusted by trial and error or velocity scans.

12. The method according to claim 1 wherein the velocity in the subsurface region is determined with the use of layer stripping.

13. The method according to claim 1 wherein the transmitter is not located on a surface and step a) includes redatuming the data such that the signals appear to have originated at an artificial source that is on a surface.

14. The method according to claim 1 wherein the data include signals transmitted from at least 100 transmitters.

15. The method according to claim 1 wherein the data include signals received by at least 10 receivers.

* * * * *